Sept. 6, 1966     E. C. BROWN ETAL     3,270,899
LOAD HANDLING VEHICLE Filed April 17, 1964     7 Sheets-Sheet 1

INVENTORS.
EDWIN C. BROWN
GRANVILLE WOOLMAN
BY
ATTORNEYS.

Sept. 6, 1966   E. C. BROWN ETAL   3,270,899
LOAD HANDLING VEHICLE

Filed April 17, 1964   7 Sheets-Sheet 2 fig.2.

fig.2a.

INVENTORS.
EDWIN C. BROWN
GRANVILLE WOOLMAN
BY
*Wolfe, Hubbard, Voit & Osann*
ATTORNEYS.

United States Patent Office 3,270,899
Patented Sept. 6, 1966

3,270,899
LOAD HANDLING VEHICLE
Edwin C. Brown, Aurora, and Granville Woolman, Naperville, Ill., assignors to Baldwin-Lima-Hamilton Corporation, a corporation of Pennsylvania
Filed Apr. 17, 1964, Ser. No. 360,501
7 Claims. (Cl. 214—75)

This invention relates generally to material handling equipment and more praticularly concerns a load handling vehicle of the self-loading type.

It is an object of the invention to provide a load handling vehicle having a fork lift capable of acting at any angle from the vehicle and of placing a load directly on the fixed bed or platform of the vehicle. A related object is to provide a vehicle of the above character which permits conventional load-crowding fork lift operation as well as being self-loading and having a 360° operating range.

Another object is to provide a vehicle of the type referred to above which can work effectively in cramped quarters since there is little tailswing or overhang despite the considerable operating reach and range of the load handling device.

A further object is to provide a vehicle as described above whose fork lift can engage or clear a load without moving the vehicle so that vehicle outriggers can be used for stable handling of heavy or awkward loads.

It is also an object to provide a vehicle as characterized above which can be easily and economically converted from a fork lift truck to a self-loading crane.

With more particularity, it is an object to provide a novel telescoping boom for a vehicle of the above type which has an appreciable reach while being simple in design and economical to manufacture. A collateral object is to provide a novel boom pivot assembly for a vehicle as characterized above which eliminates overhang, can be readily adapted for mounting a power driven hoist, and which is a compact, low-cost, easily assembled unit.

A still further object is to provide a novel power driven rotatable base or turntable for a vehicle of the above type which is a "bench" subassembly so as to greatly add to the facility and economy of constructing the vehicle of the invention. It is a related object to provide a turntable as referred to above which defines a sturdy casing shielding the bearings and drive for the rotatable element so as to create a rugged, reliable assembly.

Other objects and advantages of the invention will become apparent upon reading the following detailed description and upon reference to the drawings, in which:

FIG. 9 is a section taken approximately along the lines 9—9 in FIG. 8a; and

FIG. 10 is fragmentary section taken approximately along the line 10—10 in FIG. 9.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Figures 1, 4, 5:
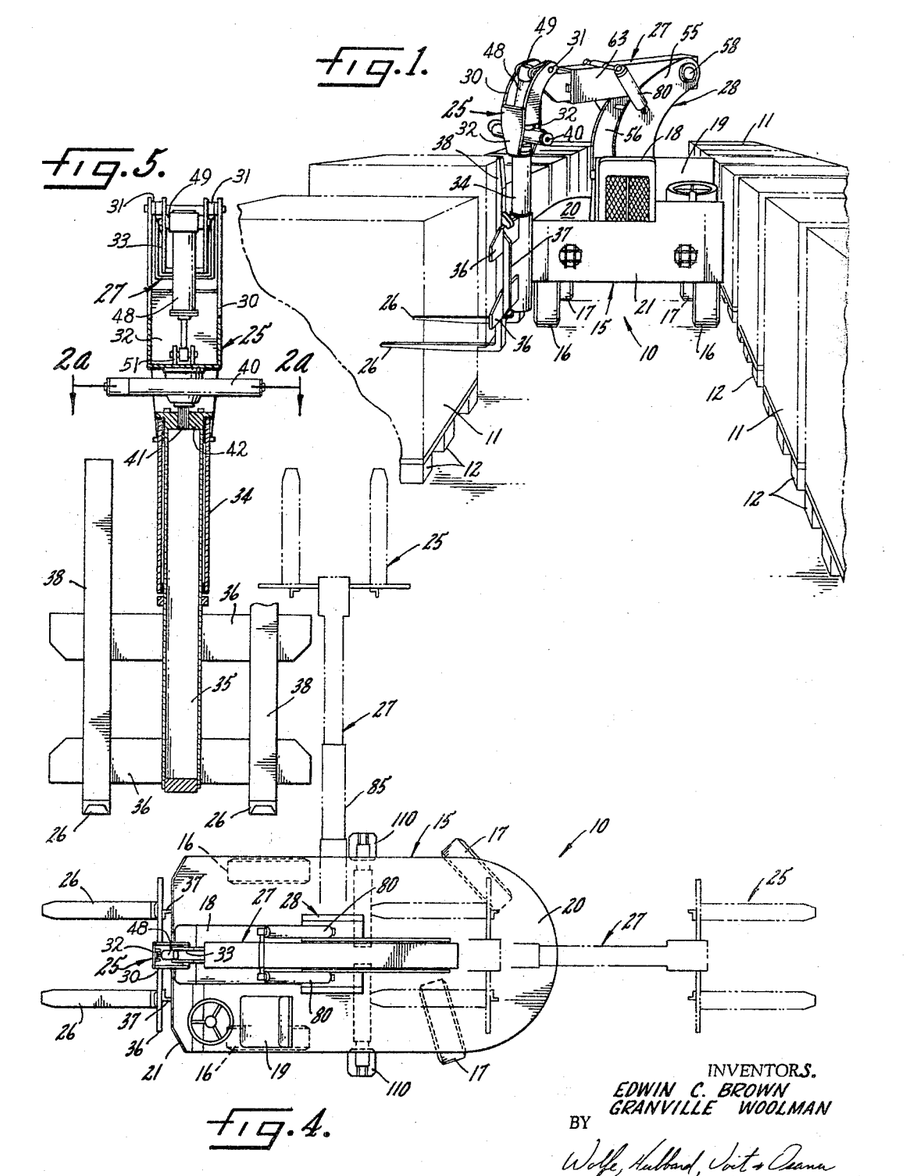
FIGURE 1 is a perspective of a vehicle embodying the invention shown in operation.
FIG. 4 is a plan view of the vehicle shown in FIG. 1 illustrating the operating range of the load handling mechanism.
FIG. 5 is a slightly enlarged end elevation of the fork lift unit shown in the vehicle of FIG. 1.

Turning first to FIG. 1, there is shown a vehicle 10 embodying the invention and operating as a fork lift truck in a narrow aisle between loads 11 arranged on alined pallets 12. The vehicle 10 is self-propelled and includes a frame or chassis 15 supported by front drive wheels 16 and rear steerable wheels 17 (see also FIG. 4). A power plant 18 is positioned centrally at the forward portion of the chassis 15, adjacent an operator's position 19 at the left front corner of the vehicle. A dack or load carrying platform 20 defines virtually the entire remaining upper portion of the chassis 15. A generally vertical, slightly wrapped around forward plate 21 constitutes the forward end of the vehicle 10.

In carrying out the invention, a fork assembly 25 having extending tines 26 is rotatably carried at the end of an extensible boom 27 that is rotatably supported by a turntable 28 at the approximate center of the vehicle so that the tines 26 can be extended from the chassis 15 through a continuously rotatable, 360° operating range, positioned solidly against the front plate 21, or reversed to overlie any portion of the load carrying platform 20. When the fork assembly 25 is solidly positioned against the plate 21 as shown in solid lines in FIGS. 2 and 4, it will be seen that the vehicle 10 is able to function as a conventional lift truck. The vehicle can be maneuvered through the rear steerable wheels 17 so as to crowd a load onto the tines 26. Upward swinging movement of the boom 27 on the turntable 28 elevates the tines so as to clear a load from the floor.

By virtue of the continuously rotatable, 360° operating range afforded by the rotatable turntable 28, loads can be handled and moved directly between points at any side of the vehicle 10, as suggested by the dashed line positions of the boom and fork assembly shown in FIG. 4. In addition, the rotatable mounting of the fork assembly 25 on the end of the extensible boom 27 permits the type of lateral load engagement shown in FIG. 1 that is, of course, impossible with a conventional fork lift truck.

Figure 3:
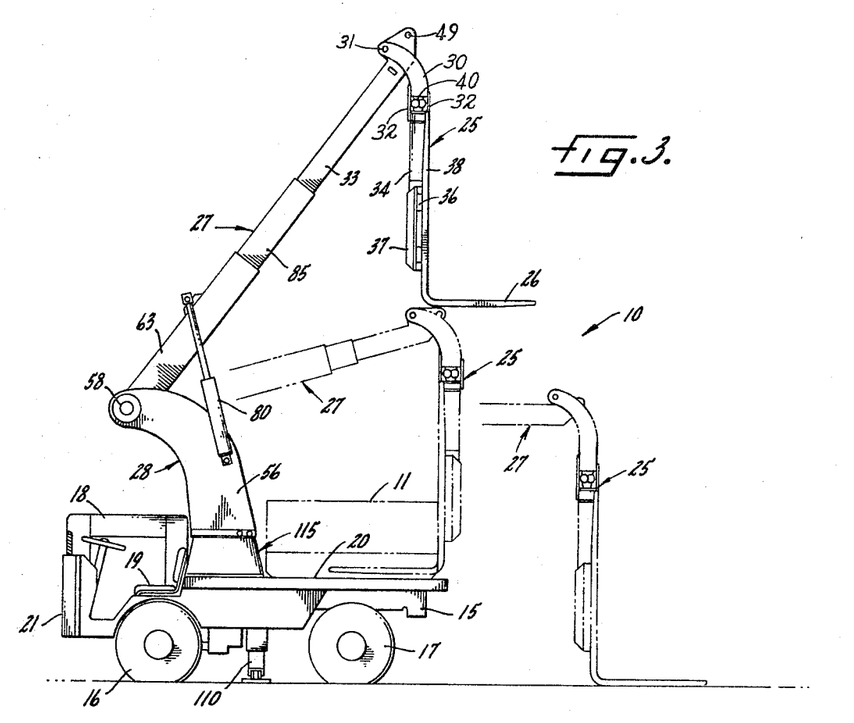

Since the tines 26 can be reversed to overlie the platform 20, the vehicle 10 is self-loading. The boom 27 can reach out to engage a load on the tines 26 whereupon the tines may be rotated about a vertical axis as shown in FIG. 3 to deposit the load on the vehicle platform 20. A second load can then be lifted and carried on the tines to double the carrying capacity of the vehicle. This again is a mode of operation that cannot be duplicated by a conventional fork lift truck.

Considering the construction of the vehicle 10 in more detail, the fork assembly includes a yoke 30 whose upper ends are pivoted at 31 (see FIG. 5) to the end of an outer member 33 of the boom 27. A pair of plates 32 are rigidly fixed to the yoke 30 so as to secure a tubular body 34 in depending relation at the end of the boom 27. The body 34 rotatably receives a column 35 to which a pair of cross bars 36 are fixed (see particularly FIG. 5). The cross bars carry back members 37 adapted to solidly abut the chassis plate 21 when the fork assembly 25 is in its solid line, FIG. 4 position. The tines 26 are formed with upstanding portions 38 which hook over the uppermost cross bar 36 so as to support the tines 26 and permit lateral adjustment of the tines along the cross bars.

Figure 2:
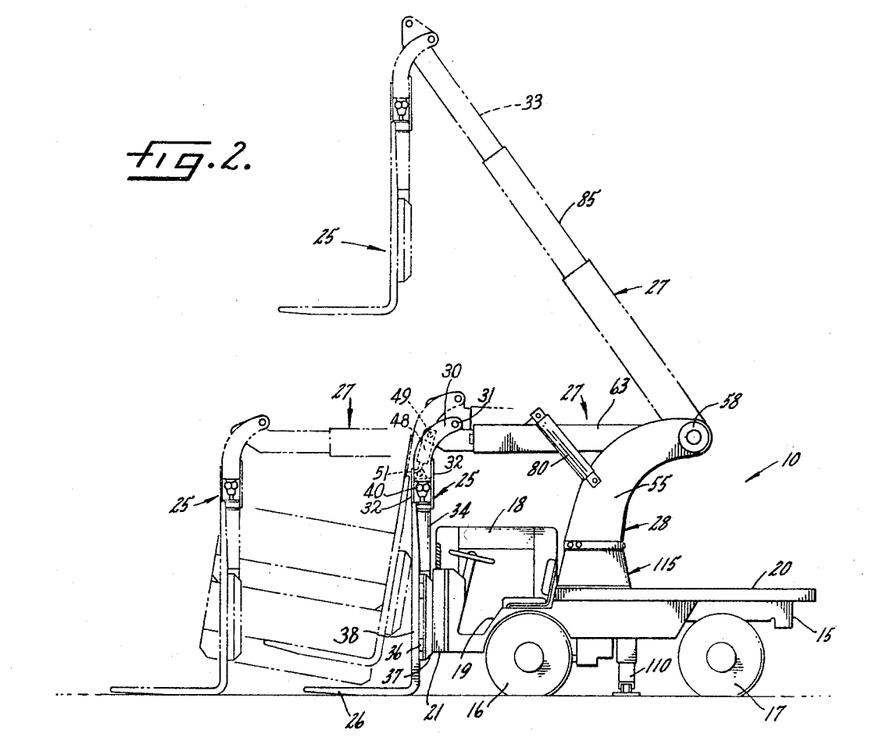
FIGS. 2 and 3 are side elevations of the vehicle shown in FIG. 1, showing the operating range of the vehicle.
Figure 2A:
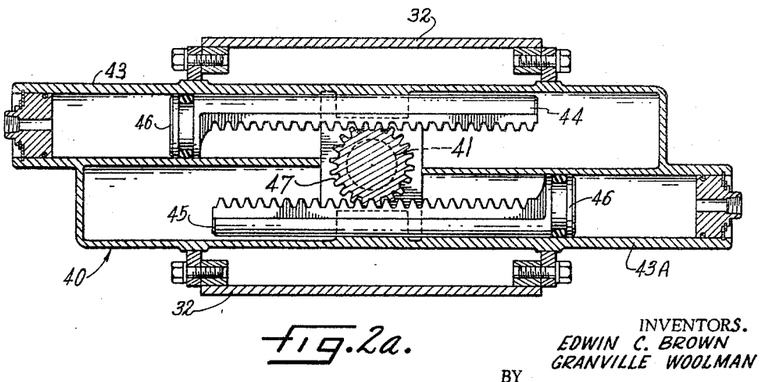
FIG. 2a is an enlarged section taken along the line 2a—2a in FIG. 5.

To rotate the tines 26 about a generally vertical axis, an actuator 40 is mounted between the plates 32 and provided with an output shaft 41 which is splined in a cap 42 forming a portion of the column 35 (see FIGS. 2a and 5). The actuator 40 includes a pair of parallel cylinders 43 and 43a in which slide racks 44 and 45, respectively, having piston-like end portions 46. The racks engage opposite sides of a pinion 47 fixed on the shaft 41. Supplying fluid under pressure to alternate ends of the cylinders 43, 43a thus rotates the shaft 41 and makes the actuator 40 a rotary actuator effective to swivel the tines 26 through a complete circle at the end of the lever 27.

To permit controlled tliting of the fork assembly 25, a double acting linear actuator 48 is pivotally connected at 49 to the end of the outer boom member 33 and at 51 to the bottom of the yoke 30. As best seen in FIG. 2, extending and retracting the actuator 48 provides a force effective to tilt the assembly 25 about the points 31. Preferably, the parts are proportioned so that both forward and backward tilting of the assembly 25 under control of the actuator 48 is permitted. Forward tilting allows a palleted load to be firmly seated back against the portions 38 of the tines, as shown in the lower portion of FIG. 2. Backward tilting permits the assembly 25 to be held in generally vertical relation when the boom 27 is raised and extended, as shown in the upper portion of FIG. 2 and in FIG. 3.

The significance of disposing the rotatable turntable 28 at approximately the center of the vehicle chassis 15 can now also be appreciated. When the boom 27 is swung forwardly of the vehicle 10 and retracted, the fork assembly 25 is disposed solidly against the front plate 21. Reversing the turntable 28 so that the boom 27 extends rearwardly of the vehicle, and also rotating the fork assembly 25 relative to the boom, disposes the fork lift tines 26 directly over the load supporting platform 20. Thus, the central positioning of the turntable 28 permits the vehicle 10 to operate both as a conventional fork lift truck and as a novel self-loading material handling vehicle.

Preferably, the vehicle 10 is proportioned so that the boom 27 is substantially horizontal when the fork assembly abouts the front plate 21 and the tines 27 rest on the surface supporting the vehicle. As a result, the boom 27 can be elevated without imposing any forward component of movement on the fork assembly 25 and this facilitates operation of the vehicle as a fork lift truck in close quarters.

Figures 6, 7:
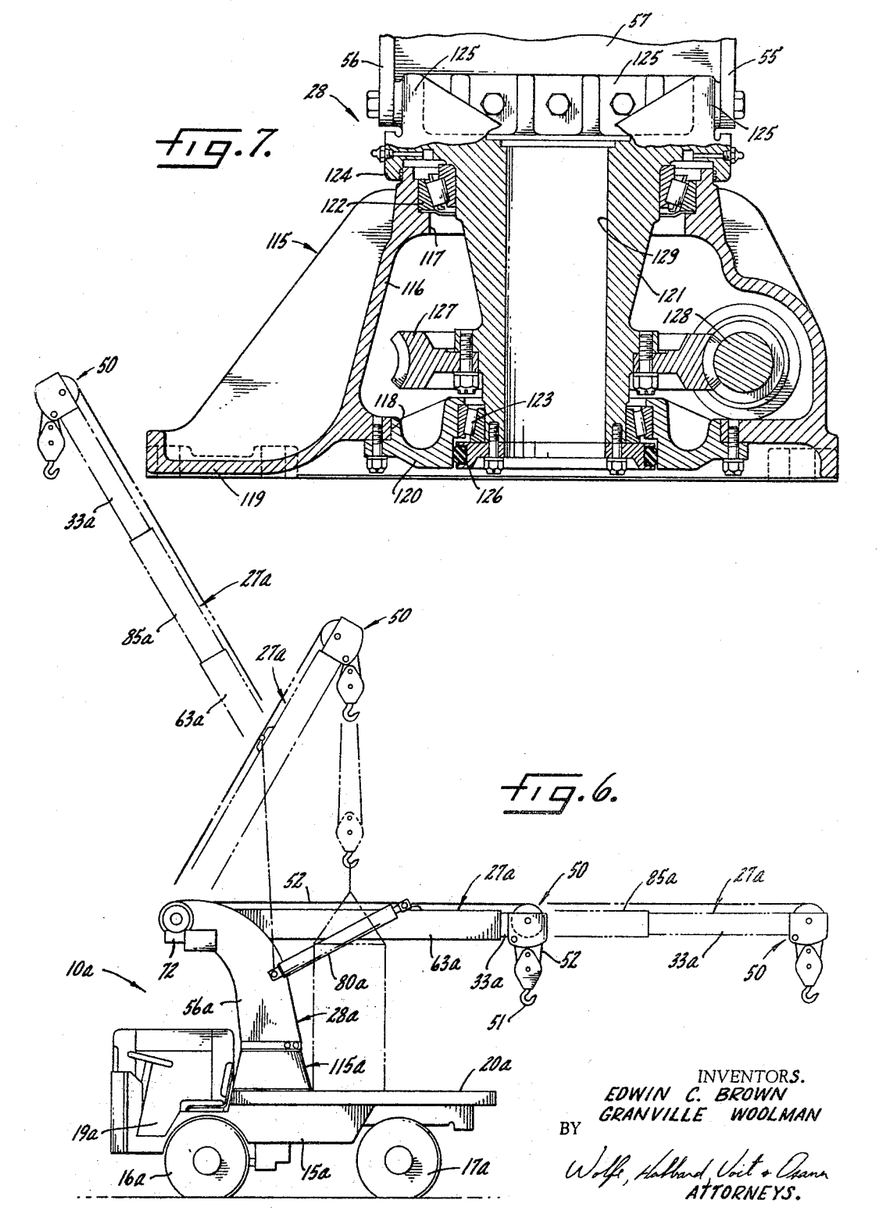
FIG. 6 is a modified vehicle also embodying the present invention.
FIG. 7 is an enlarged fragmentary section of the turntable assembly utilized in the vehicle of FIGS. 1 and 6.

Pursuant to the invention, a vehicle similar to the vehicle 10 can be easily and economically converted into a self-loading crane, as has the vehicle 10a shown in FIG. 6. For convenience, corresponding parts of the vehicles 10 and 10a have been given identical reference numerals, with the distinguishing suffix "a" added to the parts of the FIG. 6 vehicle. Thus, the vehicle 10a includes a chassis 15a supported on front drive wheels 16a and rear steerable wheels 17a. An operator's position 19a is disposed at the front left corner of the vehicle and substantially all of the remaining upper surface of the chassis 15a defines a load carrying platform 20a. A rotatable turntable 28a is positioned at approximately the center of the chassis 15a and supports, for up and down swinging movement, an extensible boom 27a. The boom 27a includes a tubular outer member 33a carrying a pulley assembly 50 on which a hook 51 is suspended by a line 52.

As shown by the dashed line positions of the boom 27a and the pulley assembly 50 in FIG. 6, the crane defined by the vehicle 10a has a considerable reach that extends continuously through full circles about the vehicle. In addition, the boom 27a can be retracted and swung upwardly so as to position a load at virtually any point on the platform 20a, even immediately adjacent the base of the turntable 28a.

In keeping with the invention, the boom 27a is pivoted on the turntable 28a so as to minimize overhang or tailswing and facilitate mounting of a hoist to control the line 52. To this end, the turntable 28a includes a pair of spaced, upstanding side plates 55a and 56a spanned by shipper 63 forming the end portion of the boom 27 between upstanding turntable plates 55 and 56. A rear turntable plate 57 is also provided spanning the plates 55, 56. In the vehicle 10, the stud members 58 and the turntable plates 55, 56 provide an easy-to-assemble, and economical, mounting for the boom 27 on the turntable 28. Furthermore, this assembly can be easily converted, as in the vehicle 10a, for crane operation. It will, of course, be appreciated that the minimum amount of overhang and the lack of boom tailswing is as significant and advantageous in the vehicle 10 as in the vehicle 10a.

For raising and lowering the boom 27a, a pair of double acting actuators 80a are pivotally secured to both the shipper 63a of the boom and the respective side plates 55a, 56a of the turntable 28a. The actuators 80a are controlled from the operator's position 19a. Similarly, actuators 80 are provided in the vehicle 10 to swing the boom 27 up and down on the turntable 28.

Figure 8A:
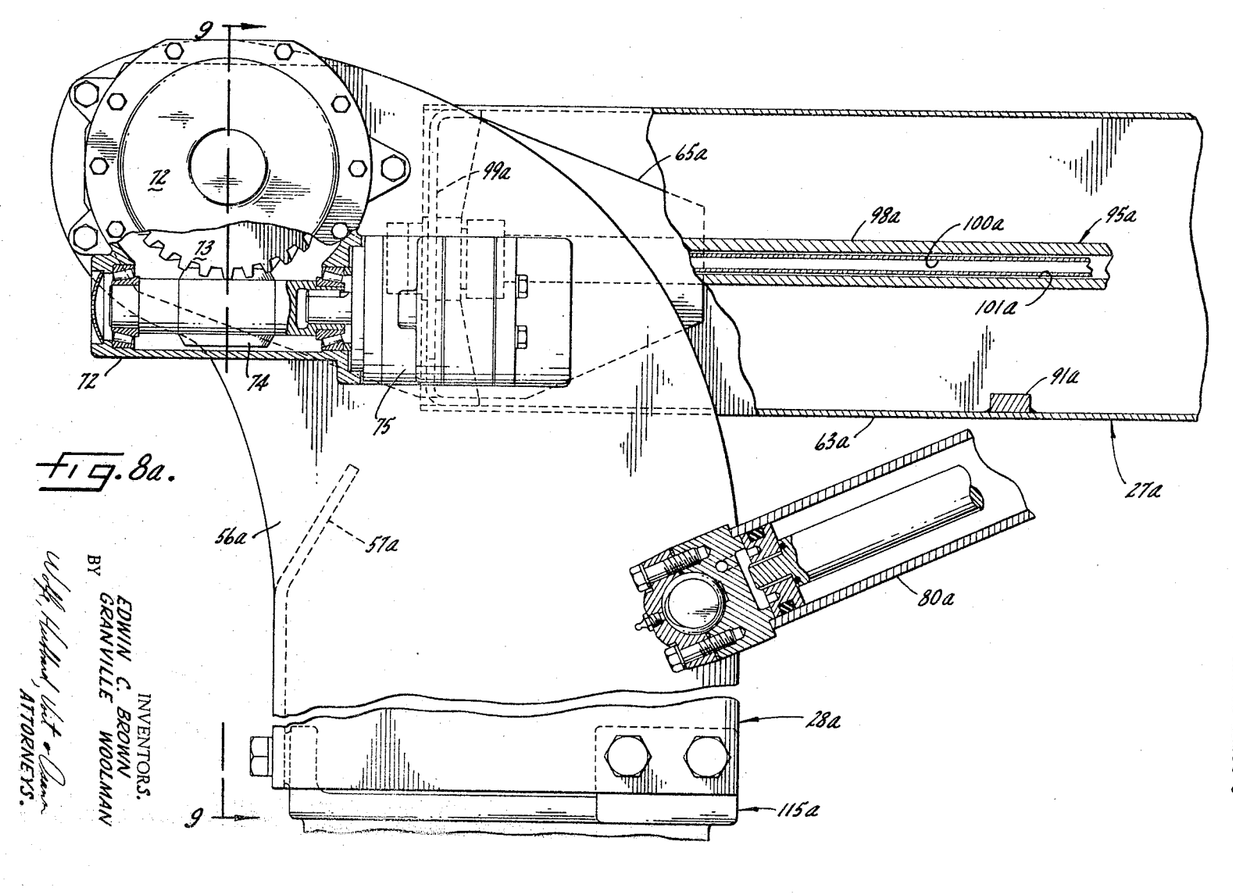
FIGS. 8a, 8b and 8c are enlarged partially sectioned elevations of the boom utilized in the vehicle of FIG. 6.
Figure 8B:
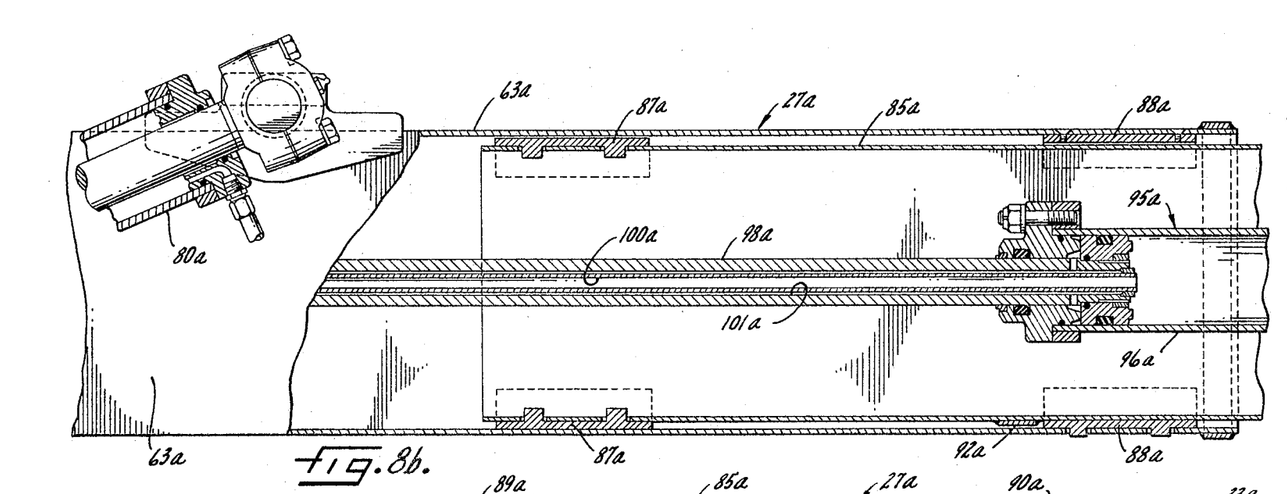
Figure 8C:
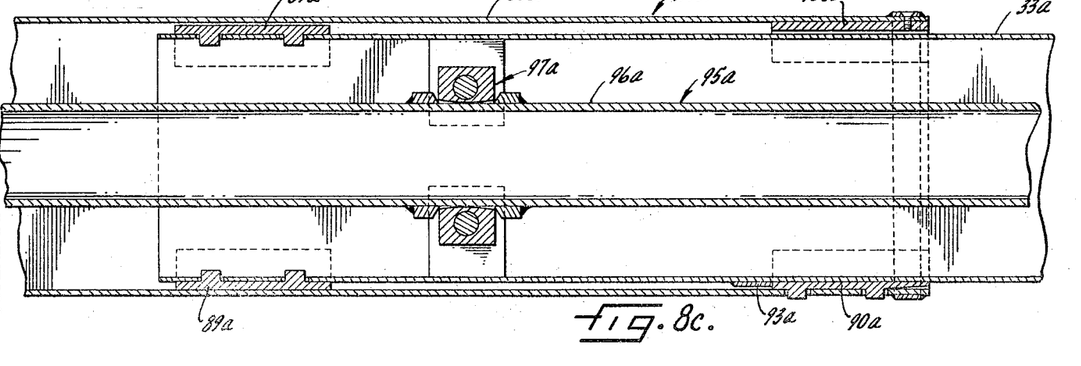

To provide the desired boom reach, the boom 27a includes a tubular intermediate member 85a disposed within the boom shipper 63a and receiving the boom outer member 33a (see FIGS. 8b and 8c). Shoes 87a are mounted at the rear of the intermediate member 85a so as to slide within the boom shipper 63a and additional shoes 88a are mounted at the outer end of the shipper 63a to guide the sliding movement of the intermediate member 85a. Similarly, shoes 89a are mounted at the rear of the outer member 33a to slide within the intermediate member 85a, and additional shoes 90a are secured at the forward end of the intermediate member 85a to guide the sliding movement of the outer member 33a. A stop 91a (see FIG. 8a) is secured within the carrier 63a to limit inward telescoping movement of the intermediate member 85a and similar stops 92a and 93a are are secured on the outer surfaces of the intermediate member 85a and the outer member 33a, respectively, so as to limit relative outward sliding a rear or closure plate 57a (see FIGS. 8a and 9). Flanged stud members 58a and 59a having cylindrical bearing surfaces 60a and 61a, respectively, are projected through apertures 62a in the upper ends of the plates 55a, 56a so that the surfaces 60a, 61a are in axial alinement. In the illustrated construction, the stud members 58a, 59a are securely screwed to the respective plates 55a, 56a.

The boom 27a includes a carrier or shipper 63a having laterally spaced extensions 64a and 65a at one end which are rotatably fitted on the bearing surfaces 60a, 61a. Thus, the boom 27a is pivotally mounted for vertical swinging movement between the turntable plates 55a, 56a. Since the boom 27a is pivoted at its extreme end on the turntable 28a there is little overhang or boom tailswing.

To provide a hoist for the crane cable 52, the stud members 58a, 59a are formed with a second set of cylindrical bearing surfaces 66a and 67a, respectively, which are also disposed in axial alinement and which rotatably support a hoist drum 68 between boom bearing flanges 64a, 65a. The cable 52 is wound on the drum 68. The stud member 59a is formed with a central opening 69 through which a shaft 70 extends into splined engagement at 71 with the hoist drum 68. The shaft 70 is journalled in a housing 72 and carries a worm gear 73 which meshes with a worm 74 that is driven by a hydraulic motor 75 attached to the housing 72. The housing 72 is rigidly secured, preferably by bolts, to the outer surface of the turntable plate 56a. It can thus be seen that rotation of the worm 74 under the power of the motor 75 is effective to drive the hoist drum 68 and thus control the vertical position of the crane hook 51. Preferably, the hydraulic motor 74 is controlled from the operator's position 19a.

In the vehicle 10, since a cable hoist is not required, a pair of stud members 58, each of which corresponds to the stud member 58a, rotatably support the boom 27 by mounting a tubular carrier or movement of the boom members (see FIGS. 8b and 8c) and thus pull the intermediate member 85a out.

Figures 9, 10:
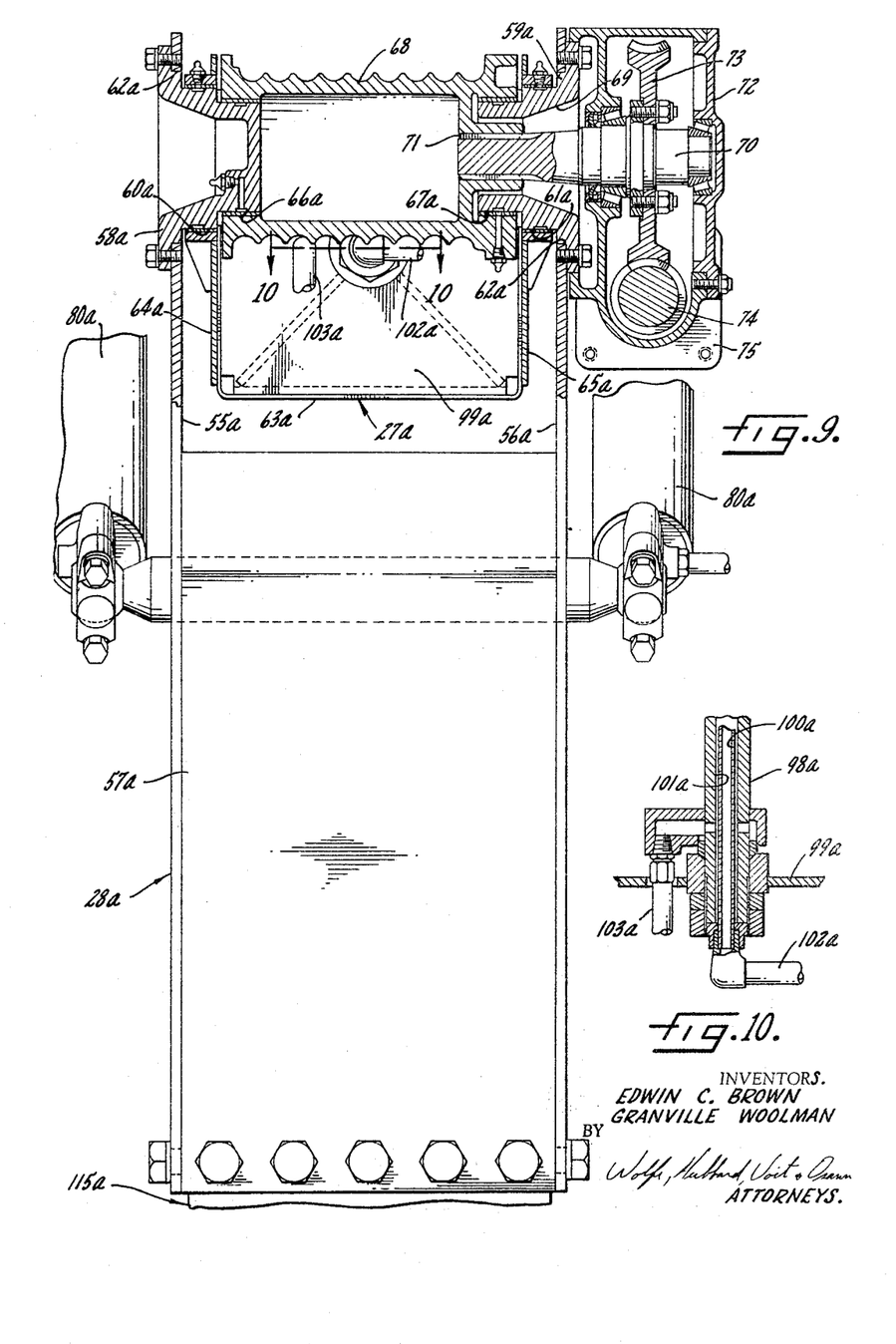

The boom 27a is extended and retracted by a powered linear actuator 95 whose cylinder 96a is supported by a swivel yoke assembly 97a within the boom outer member 33a, and whose piston rod 98a is anchored to an end plate 99a fixed in the rear end of the shipper 63a (see FIGS. 8a and 9). Preferably, the rod 98a is double walled so as to have a center cylindrical passage 100a through which fluid is admitted to the cylinder 96a to extend the boom, and a surrounding annular passage 101a through which fluid is transferred to the opposite end of the cylinder 96a so as to telescope or collapse the boom members. Lines 102a and 103a open into the respective passages 100a, 101a (see FIGS. 9 and 10). Fluid transfer to the lines 102a, 103a is controlled from the the operator's position 19a.

The boom 27 on the vehicle 10 is, like the boom 27a, provided with an intermediate member 85 that is slidably received within the shipper 63 and which, in turn, slidably receives the outer member 33. A linear actuator (not shown) corresponding to the actuator 95a is positioned within the boom 27 to extend and retract the boom with control being had from the operator's position 19.

Of particular significance in connection with the vehicle 10 is the fact that the boom 27 is extensible from the periphery of the chassis 15 a distance which exceeds the length of the tines 26 (see particularly FIG. 2) so that a load can be engaged and disengaged without moving the vehicle. This permits the vehicle chassis 15 to be stabilized by a pair of retractable outriggers 110 so that heavy, awkward loads can be reliably and precisely handled by the fork lift assembly 25. The triple telescoping boom 27 gives the required reach for handling loads without moving the vehicle 10, as well as permitting the assembly 25 to abut the plate 21 or to swing around and deposit a load on the load carrying platform 20.

As a feature of the invention, the plates 55, 56 and 57 of the turntable 28 are carried by a self-contained assembly 115 that is rigidly secured to the chassis 15 and which provides for rotation of the turntable (see also FIG. 7). The assembly 115 includes a generally annular pedestal 116 having an open top and bottom 117 and 118, respectively, as well as a bottom flange 119 that is secured to the vehicle chassis 15. The bottom plate 120 is secured across the opening 118 in the pedestal and a post 121 is journalled by bearnings 122 and 123 mounted respectively in the top pedestal opening 117 and the plate 120. At its upper end, the post 121 is formed with a lip 124, which overlies the upper end of the pedestal 116, and upstanding flanges 125 to which the plates 55–57 are secured. The overlying lip 124, together with a rotary seal 126 interposed between the bottom of the post 121 and the surrounding plate 120, close a chamber defined within the pedestal 116.

To rotate the turntable 28, a worm gear 127 is secured to the post 121 within the pedestal 116 and a drive worm 128 powered by a hydraulic motor (not shown) is disposed in meshing engagement with the gear 127. Rotation of the worm 128, controlled from the operator's position 19, thus rotates the post 121 to swing the turntable 28 about a generally vertical axis completely through a full circle in either direction. Preferably, the post 121 is formed with a central aperture 129 which provides access from beneath the pedestal 116 to the bottom 27 for hydraulic or electric lines which might be required to operate the several actuators mounted on either the turntable 28 or the boom 27.

Those skilled in the art will appreciate that the assembly 115 can be considered a "bench" subassembly of the vehicle 10 that can be economically manufactured and assembled and then installed as a unit on the vehicle chassis 15. This greatly facilitates construction and servicing of the vehicle. Moreover, it will be noted that the bearings and drive for the turntable 28 are completely enclosed and protected within the pedestal 116.

In the vehicle 10a, the turntable 28a includes an assembly 115a corresponding in construction and operation to the assembly 115 described above.

We claim as our invention:

1. A load handling vehicle comprising, in combination, a self-propelled chassis, a load carrying platform fixed on said chassis at one end thereof, a turntable mounted at the approximate center of said chassis for rotation about a vertical axis, an extensible boom mounted on said turntable for up and down swinging movement, and a fork assembly having tines and being mounted at the end of said boom for rotation about a generally vertical axis, said boom and turntable being proportioned to permit said fork assembly to be both positioned solidly against one end of said chassis with the tines extending therefrom as well as reversed so that the tines extend toward the turntable and overlie said platform, whereby a load can be handled as with a conventional fork lift truck and can also be lifted onto and off of said platform.

2. A load handling vehicle comprising, in combination, a self-propelled chassis, a load carrying platform fixed on said chassis at one end thereof, a turntable mounted at the approximate center of said chassis for rotation about a vertical axis, means for rotating said turntable, an extensible boom mounted on said turntable for up and down swinging movement, an actuator for selectively swinging said boom up and down, a linear actuator for extending and retracting said boom, and a fork assembly mounted at the end of said boom for rotation about a generally vertical axis, an actuator coupled to said boom end for rotating said fork assembly, said boom and turntable being proportioned to permit said fork assembly to be both positioned solidly against one end of said chassis with the tines extending therefrom as well as reversed so that the tines extend toward the turntable and overlie said platform, whereby a load can be handled as with a conventional fork lift truck and can also be lifted onto and off of said platform.

3. A load handling vehicle comprising, in combination, a self-propelled chassis, a load carrying platform fixed on said chassis at one end thereof, a turntable mounted at the approximate center of said chassis for continuous rotation about a vertical axis, an extensible boom mounted on said turntable for up and down swinging movement, and a fork assembly having tines and being mounted at the end of said boom for rotation about a generally vertical axis, said boom being extensible from the periphery of said chassis a distance exceeding the length of said tines so that a load can be engaged and disengaged without moving the vehicle, said boom and turntable permitting said fork assembly to be both extended and retracted from said chassis through a 360° operating range as well as rotated so that the tines extend toward the turntable and overlie said platform, whereby a load can be handled as with a conventional fork lift truck and can also be lifted onto and off of said platform.

4. A load handling vehicle comprising, in combination, a self-propelled chassis, a load carrying platform fixed on said chassis at one end thereof, a turntable mounted at the approximate center of said chassis for rotation about a vertical axis, a tubular boom base member mounted on said turntable for up and down swinging movement, a tubular intermediate member disposed within said base member, a tubular end member disposed within said intermediate member, a linear actuator disposed within and coupling said base member and said end member for extending and retracting said boom, and a fork assembly mounted at the end of said boom for rotation about a generally vertical axis, said boom being extensible from the periphery of said chassis a distance exceeding the length of said tines so that a load can be engaged and disengaged without moving the vehicle, said boom and turntable permitting said fork assembly to be both extended from said chassis through a 360° operating range as well as reversed so that the tines extend toward the turntable and overlie said platform, whereby a load can be handled as with a conventional fork lift truck and can also be lifted onto and off of said platform.

5. A load handling vehicle comprising, in combination, a self-propelled chassis, a load carrying platform fixed on said chassis, a turntable mounted on said chassis for rotation about a vertical axis, an extensible boom mounted on said turntable for up and down swinging movement, and a fork assembly having tines and being mounted at the end of said boom for rotation about a generally vertical axis, said boom and turntable permitting said fork assembly to be reversed so that the tines extend toward the turntable and overlie said platform, whereby a load can be handled as with a conventional fork lift truck and can also be lifted onto and off of said platform.

6. A load handling vehicle comprising, in combination, a self-propelled chassis, a load carrying platform fixed on said chassis, a turntable mounted at the approximate center of said chassis for rotation about a vertical axis, means for rotating said turntable, an extensible boom mounted on said turntable for up and down swinging movement, an actuator for selectively swinging said boom up and down, a linear actuator for extending and retracting said boom, a fork assembly mounted at the end of said boom for rotation about both a horizontal tilting axis and a generally vertical axis, and means for selectively rotating said fork assembly about both said tilting axis and said vertical axis.

7. A load handling vehicle comprising, in combination, a self-propelled chassis, a load carrying platform fixed on said chassis, a turntable mounted on said chassis for rotation about a vertical axis, an extensible boom mounted on said turntable for up and down swinging movement, and a fork assembly mounted at the end of said boom for both tilting and horizontal swiveling movement, said boom and turntable being proportioned to permit said fork assembly to be positioned solidly against one end of said chassis with the tines of the assembly extending from the chassis, said fork assembly and said turntable being proportioned so that said boom is horizontal when the tines are at the vehicle supporting surface and said assembly is against said chassis end.

References Cited by the Examiner

UNITED STATES PATENTS

| | | | |
|---|---|---|---|
| 2,571,858 | 10/1951 | Garland | 212—55 |
| 2,643,515 | 6/1953 | Harsch | 212—55 X |
| 2,646,182 | 7/1953 | Maas | 214—672 |
| 2,772,795 | 12/1956 | Cramer et al. | |
| 2,798,622 | 7/1957 | Kelly et al. | |
| 2,980,269 | 4/1961 | Zimmerman | 214—75 |
| 3,044,635 | 7/1962 | Kirsten | 212—55 |
| 3,179,267 | 4/1965 | Bliss | 214—141 |

GERALD M. FORLENZA, *Primary Examiner.*

HUGO O. SCHULZ, *Examiner.*

R. G. SHERIDAN, *Assistant Examiner.*